US010654459B2

(12) United States Patent
Englert et al.

(10) Patent No.: US 10,654,459 B2
(45) Date of Patent: May 19, 2020

(54) CONTROL DEVICE AND METHOD FOR EXECUTING A HOLDING FUNCTION WITH THE AID OF A HYDRAULIC BRAKING SYSTEM OF A VEHICLE (71) Applicant: Robert Bosch GmbH, Stuttgart (DE)

(72) Inventors: Andreas Englert, Untergruppenbach (DE); Tobias Putzer, Bad Friedrichshall (DE)

(73) Assignee: Robert Bosch GmbH, Stuttgart (DE)

( * ) Notice: Subject to any disclaimer, the term of this patent is extended or adjusted under 35 U.S.C. 154(b) by 57 days.

(21) Appl. No.: 16/023,554

(22) Filed: Jun. 29, 2018

(65) Prior Publication Data
US 2019/0016323 A1 Jan. 17, 2019

(30) Foreign Application Priority Data
Jul. 12, 2017 (DE) .......... 10 2017 211 871

(51) Int. Cl.
B60T 13/16 (2006.01)
B60T 13/74 (2006.01)
B60T 13/68 (2006.01)
B60T 10/00 (2006.01)
B60T 13/14 (2006.01)
(Continued)

(52) U.S. Cl.
CPC .......... B60T 13/686 (2013.01); B60T 7/122 (2013.01); B60T 8/00 (2013.01); B60T 8/17 (2013.01); B60T 8/326 (2013.01); B60T 10/00 (2013.01); B60T 13/142 (2013.01); B60T 13/161 (2013.01); B60T 13/162 (2013.01); B60T 13/662 (2013.01); B60T 13/745 (2013.01); B60T 2201/06 (2013.01)

(58) Field of Classification Search
CPC .......... B60T 7/12; B60T 7/122; B60T 13/662; B60T 13/686; B60T 13/161; B60T 13/162; B60T 13/745; B60T 8/00; B60T 8/17; B60T 8/24; B60T 8/245; B60T 10/00; B60T 13/142
USPC ........................................ 303/192
See application file for complete search history.

(56) References Cited
U.S. PATENT DOCUMENTS

6,332,654 B1 * 12/2001 Yano ................ B60T 7/122
188/353
7,325,887 B2 * 2/2008 McCann ............ B60T 1/005
188/72.9
(Continued)

Primary Examiner — Thomas J Williams
(74) Attorney, Agent, or Firm — Norton Rose Fulbright US LLP; Gerard Messina (57) ABSTRACT A control device and method for executing a holding function using a hydraulic braking system of a vehicle including building up an initial holding pressure in at least one wheel brake cylinder using at least one brake pressure buildup device and closing at least one shutoff valve situated between the at least one wheel brake cylinder and the at least one brake pressure buildup device, a new holding pressure being built up in the wheel brake cylinder, in that an intermediate pressure less than the new holding pressure is built up between the shutoff valve and the brake pressure buildup device using the brake pressure buildup device, the shutoff valve is opened upon the presence of the intermediate pressure between the shutoff valve and the brake pressure buildup device, and brake fluid is transferred using the brake pressure buildup device through the open shutoff valve into the wheel brake cylinder.

14 Claims, 3 Drawing Sheets

(51) Int. Cl.
*B60T 8/17* (2006.01)
*B60T 8/32* (2006.01)
*B60T 7/12* (2006.01)
*B60T 8/00* (2006.01)
*B60T 13/66* (2006.01)

(56) References Cited

U.S. PATENT DOCUMENTS

| | | | |
|---|---|---|---|
| 7,699,410 B2 * | 4/2010 | Beck | B60T 13/745 303/155 |
| 8,480,185 B2 * | 7/2013 | Itoh | B60T 7/12 303/192 |
| 9,233,675 B2 * | 1/2016 | Grell | B60T 7/122 |
| 9,517,770 B2 * | 12/2016 | Yu | B60T 7/122 |
| 2005/0001481 A1 * | 1/2005 | Kley | B60T 7/122 303/191 |
| 2007/0085417 A1 * | 4/2007 | Kamikado | B60T 7/122 303/192 |

* cited by examiner

CONTROL DEVICE AND METHOD FOR EXECUTING A HOLDING FUNCTION WITH THE AID OF A HYDRAULIC BRAKING SYSTEM OF A VEHICLE

CROSS REFERENCE

The present application claims the benefit under 35 U.S.C. § 119 of German Patent Application No. DE 102017211871.7 filed on Jul. 12, 2017, which is expressly incorporated herein by reference in its entirety.

FIELD

The present invention relates to a method for executing a holding function with the aid of a hydraulic braking system of a vehicle. Furthermore, the present invention relates to a control device for a hydraulic braking system of a vehicle and a hydraulic braking system for a vehicle.

BACKGROUND INFORMATION

Figure 1:
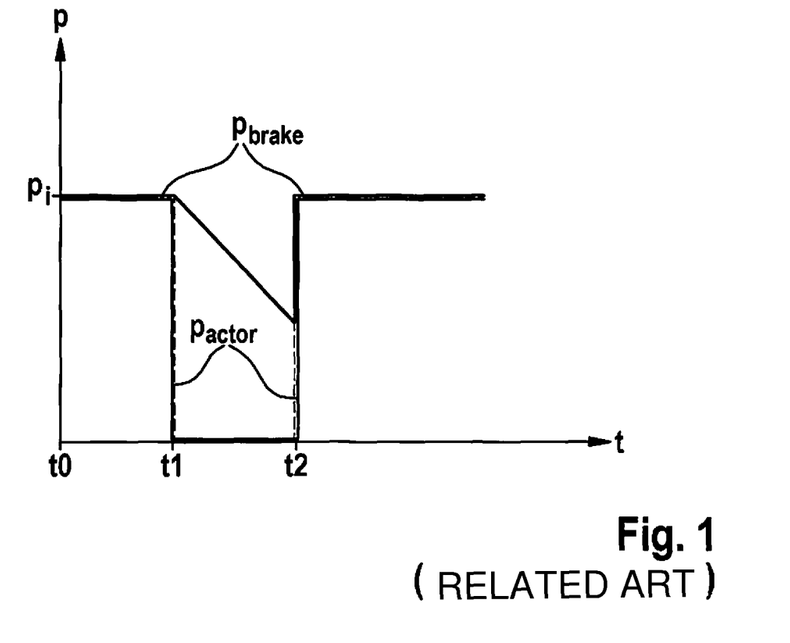
FIG. 1 shows a coordinate system to explain a conventional vehicle holding method.

FIG. 1 shows a coordinate system to explain a conventional vehicle holding method. In the coordinate system of FIG. 1, an abscissa is a time axis t, while pressures p are indicated with the aid of an ordinate.

A vehicle is to be able to be held automatically at a standstill for a long time without an undesirable rolling away of the vehicle with the aid of the conventional vehicle holding method schematically shown in FIG. 1. For this purpose, at a point in time to, an initial holding pressure pi is built up in at least one wheel brake cylinder of a hydraulic braking system of the vehicle with the aid of at least one (motorized) brake pressure buildup device of the hydraulic braking system. In the coordinate system of FIG. 1, a graph $p_{brake}$ indicates a wheel brake cylinder pressure $p_{brake}$ (actually) present in the at least one wheel brake cylinder.

At a point in time t1, at least one shutoff valve situated between the at least one wheel brake cylinder and the at least one brake pressure buildup device is closed, whereby initial holding pressure $p_i$ is temporarily "enclosed" in the at least one wheel brake cylinder. In the coordinate system of FIG. 1, an actuator pressure $p_{actuator}$ (actually) present between the at least one shutoff valve and the at least one brake pressure buildup device is indicated with the aid of a further graph $p_{actuator}$. Because of the closing of the at least one shutoff valve, the at least one brake pressure buildup device may be deactivated/shut off after point in time t1, so that actuator pressure $p_{actuator}$ present between the at least one shutoff valve and the at least one brake pressure buildup device is (nearly) equal to zero. In contrast, wheel brake cylinder pressure $p_{brake}$ may be kept nearly at initial holding pressure $p_i$ for a longer period. To nonetheless compensate for a pressure reduction of wheel brake cylinder pressure $p_{brake}$ occurring in the course of time, at a point in time t2, the at least one brake pressure buildup device is reactivated and operated in such a way that actuator pressure $p_{actuator}$ present between the at least one shutoff valve and the at least one brake pressure buildup device is increased at least to initial holding pressure $p_i$. Actuator pressure $p_{actuator}$ present between the at least one shutoff valve and the at least one brake pressure buildup device is increased so strongly that after opening of the at least one shutoff valve (at a point in time t2+δt, where δt→0), initial holding pressure $p_i$ is again present in the at least one wheel brake cylinder. The opening of the at least one shutoff valve (at point in time t2+δt) therefore triggers an overflow of the at least one shutoff valve, whereby wheel brake cylinder pressure $p_{brake}$ is again increased to initial holding pressure $p_i$. (A "subsequent supply" for the additional increase of wheel brake cylinder pressure $p_{brake}$ is therefore no longer executed after the opening of the at least one shutoff valve.)

Initial holding pressure $p_i$ is subsequently "enclosed" in the at least one wheel brake cylinder by closing the at least one shutoff valve again.

SUMMARY

The present invention provides an example method for executing a holding function with the aid of a hydraulic braking system of a vehicle, a control device for a hydraulic braking system of a vehicle, and a hydraulic braking system for a vehicle.

The present invention provides options for executing a holding function with the aid of a hydraulic braking system of a vehicle, where in contrast to the related art, a clearly audible overflow of at least one employed shutoff valve is prevented. This results in a significantly lower noise level (or a significantly lesser noise generation) during the execution of the holding function. A driver of a vehicle/motor vehicle using the present invention is therefore not irritated by noises generated during the overflow of the at least one shutoff valve. The present invention therefore also contributes to increasing an acceptance of holding functions with drivers.

Another advantage of the present invention is that no additional components/devices are to be installed on the particular vehicle/motor vehicle to implement it on a vehicle/motor vehicle. Instead, the present invention is implementable solely by "reprogramming" of an electronics unit of the vehicle/motor vehicle.

In one advantageous specific embodiment of the method, an intermediate pressure, which is less by a factor of between 1.2 and 10 in comparison with the new holding pressure, is built up between the at least one shutoff valve and the at least one brake pressure buildup device with the aid of the at least one brake pressure buildup device. In particular, an intermediate pressure, which is less by a factor of between 1.3 and 10 in comparison with the new holding pressure, may be built up between the at least one shutoff valve and the at least one brake pressure buildup device with the aid of the at least one brake pressure buildup device. An overflow of the at least one shutoff valve which is audible/perceptible to a driver therefore no longer occurs/hardly occurs upon the opening of the valve (upon the presence of the intermediate pressure between the at least one shutoff valve and the at least one brake pressure buildup device).

In another advantageous specific embodiment, a brake pressure equal to an estimated or measured wheel brake cylinder pressure is built up between the at least one shutoff valve and the at least one brake pressure buildup device with the aid of the at least one brake pressure buildup device. In this case, a pressure equality (essentially) exists between the wheel brake cylinder pressure (actually) present in the at least one wheel brake cylinder and the intermediate pressure between the at least one shutoff valve and the at least one brake pressure buildup device. The at least one shutoff valve may therefore be (nearly) opened without an overflow.

For example, the initial holding pressure and the new holding pressure are built up with the aid of a motorized piston-cylinder device of the hydraulic braking system, with the aid of at least one pump of the hydraulic braking system, and/or with the aid of an electromechanical brake booster connected upstream from a master brake cylinder of the hydraulic braking system as the at least one brake pressure buildup device. Relatively cost-effective braking system components, which require comparatively little installation space and are often already provided on conventional hydraulic braking systems, may therefore be used as the at least one brake pressure buildup device. A usage of the present invention therefore does not increase an installation space requirement of the hydraulic braking system used for this purpose. Moreover, a usage of the present invention contributes hardly/not at all to the increase of manufacturing costs of the hydraulic braking system used for this purpose.

The above-described advantages are also ensured in a control device for a hydraulic braking system of a vehicle. It is to be expressly noted that the control device may be refined according to the above-explained specific embodiments of the method.

Furthermore, the above-described advantages are also ensured in a hydraulic braking system for a vehicle including such a control device. The hydraulic braking system may also be refined according to the above-explained specific embodiments of the method.

BRIEF DESCRIPTION OF THE DRAWINGS

Further features and advantages of the present invention are explained below on the basis of the figures.

DETAILED DESCRIPTION OF EXAMPLE EMBODIMENTS

Figure 2:
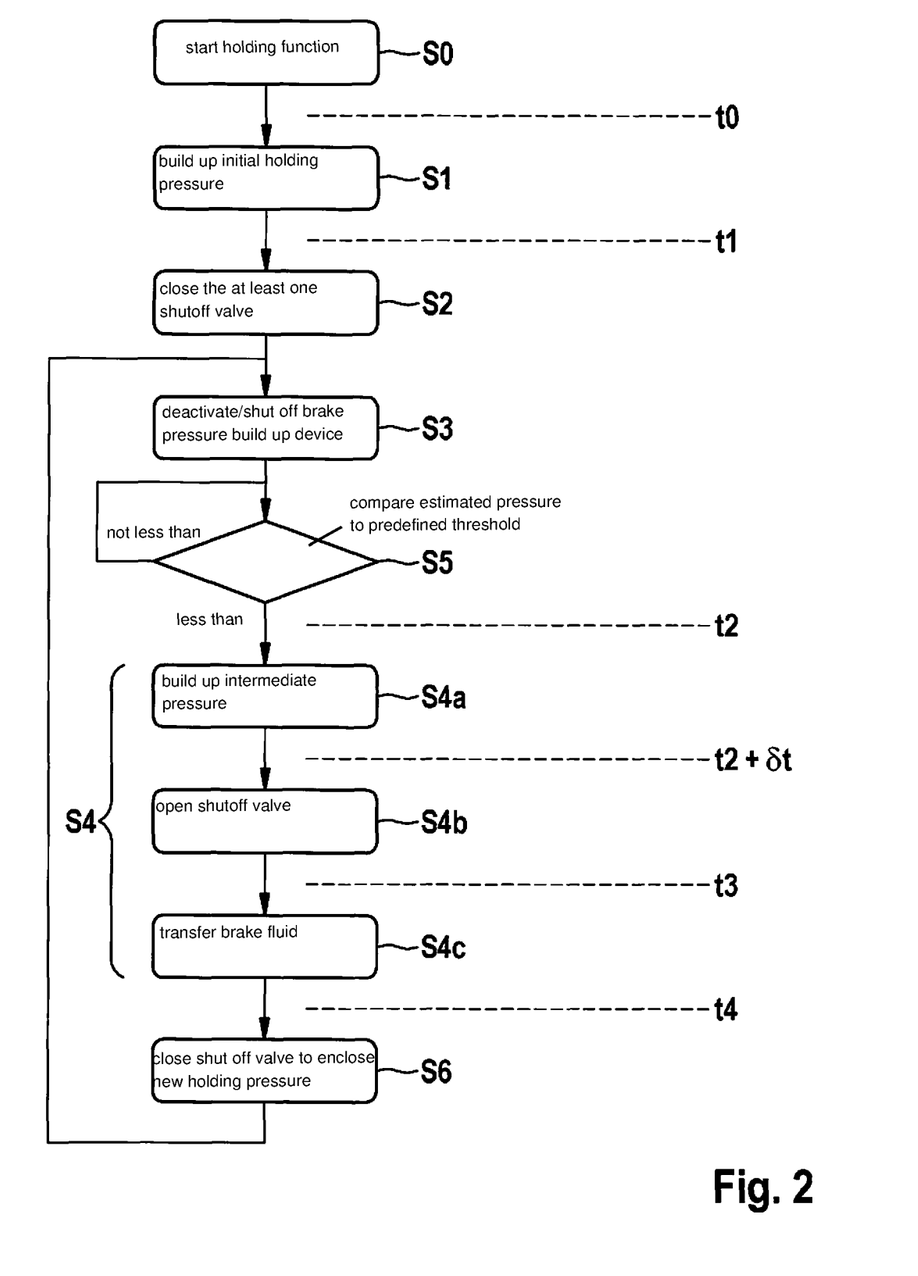
FIG. 2 shows a flow chart to explain one specific embodiment of the method for executing a holding function with the aid of a hydraulic braking system of a vehicle.

FIG. 2 shows a flow chart to explain one specific embodiment of the method for executing a holding function with the aid of a hydraulic braking system of a vehicle.

Any hydraulic braking system which includes at least the braking system components mentioned hereafter may be used to execute the method described hereafter. Furthermore, an ability to execute the method is not limited to a specific vehicle type/motor vehicle type of the vehicle/motor vehicle equipped with the hydraulic braking system.

The holding function started in a method step S0 may be understood as any automatic vehicle function (automatic auxiliary function or automatic comfort function) of the vehicle, with the aid of which the vehicle is automatically held at a standstill for a longer period. Even a standstill of the vehicle in an inclined position (for example, on a hill) may also be automatically effectuated with the aid of the holding function. In particular, the desired standstill of the vehicle may be automatically effectuated for a longer period (for example, at least 10 minutes), without a driver of the vehicle having to actuate a brake actuation element/brake pedal continuously/uninterruptedly for this purpose. The holding function may be, for example, a hill start aid (HHC, hill hold control), a hill start assistant (hill start assist, hill start aid), a hill holding aid (hill holder), or a vehicle holding aid (AVH, automated vehicle hold).

To execute the holding function, from a point in time t0, in a method step S1, an initial holding pressure is built up in at least one wheel brake cylinder of the hydraulic braking system with the aid of at least one (motorized) brake pressure buildup device of the hydraulic braking system. Brake fluid is transferred through at least one open shutoff valve/shutoff valve, which is situated between the at least one wheel brake cylinder and the at least one brake pressure buildup device, with the aid of the at least one brake pressure buildup device until an estimated or measured wheel brake cylinder pressure in the at least one wheel brake cylinder is (approximately) equal to the initial holding pressure.

The initial holding pressure may be a (permanently) predefined or fixed pressure value. For example, the initial holding pressure may correspond to a pressure value which is increased by a boost factor (in particular a boost factor of 2.5) in relation to a minimum wheel brake cylinder pressure which is required in the at least one wheel brake cylinder for securely holding the vehicle even in an inclined position. The minimum wheel brake cylinder pressure required in the at least one wheel brake cylinder for securely holding the vehicle even in an inclined position may be fixed, for example, in consideration of a (measurable) vehicle longitudinal acceleration acting on the vehicle.

At a point in time t1, with the aid of a method step S2, the at least one shutoff valve situated between the at least one wheel brake cylinder and the at least one brake pressure buildup device is closed in such a way that the initial holding pressure is temporarily "enclosed" in the at least one wheel brake cylinder. The at least one brake pressure buildup device is preferably thereafter deactivated/shut off in a method step S3, whereby an actuator pressure (actually) present between the at least one wheel brake cylinder and the at least one brake pressure buildup device drops to (nearly) zero. This may be described as a "depressurization" of the at least one brake pressure buildup device. In contrast, a fast pressure drop in the at least one wheel brake cylinder is suppressed with the aid of the closing/keeping closed of the at least one shutoff valve.

The execution of method steps S2 and S3 contributes significantly to reducing a power consumption necessary to actively retain the initial holding pressure in the at least one wheel brake cylinder. Furthermore, with the aid of the deactivation/shut off of the motorized brake pressure buildup device in method step S3, a noise generation (due to the at least one brake pressure buildup device, which otherwise continues to operate) may be prevented. Method steps S2 and S3 therefore effectuate a (nearly) noiseless retention of the initial holding pressure.

At a later point in time t2, the method is continued with a method step S4. Method step S4 is preferably executed if/as soon as a (significant) pressure drop difference is present or appears probable between the (desired) initial holding pressure and the wheel brake cylinder pressure (actually) present in the at least one wheel brake cylinder (for example, greater than a predefined minimum pressure drop difference). Several minutes may lie between points in time t1 and t2 (depending on component designs of the hydraulic braking system and surrounding conditions in surroundings of the vehicle).

For example, method step S4 is executed if, after the closing of the at least one shutoff valve (at point in time t1), an estimated or measured wheel brake cylinder pressure in the at least one wheel brake cylinder falls below a predefined threshold value and/or after the closing of the at least one shutoff valve (at point in time t1), a predefined waiting time is exceeded. A measurement of the wheel brake cylinder pressure (with the aid of at least one pressure sensor) is not necessary. The wheel brake cylinder pressure may also be estimated in a model-supported manner. A presence of a (significant) pressure drop difference between the (desired) initial holding pressure and the (actual) wheel brake cylinder pressure may also be established indirectly on the basis of a vehicle behavior. Point in time t2 for executing/beginning method step S4 may be recognized, for example, from a (beginning) rolling of the vehicle, for example, with the aid of a wheel speed sensor.

By way of example, a model-supported pressure estimation is executed in the method described here in an intermediate step S5, with the aid of which the wheel brake cylinder pressure in the at least one wheel brake cylinder is estimated and compared to the predefined threshold value. (The predefined threshold value may be, for example, equal to 1.5 times the minimum wheel brake cylinder pressure required in the at least one wheel brake cylinder for securely holding the vehicle even in an inclined position.) If the estimated wheel brake cylinder pressure is less than the predefined threshold value, the method is continued with method step S4. Otherwise, method step S5 is repeated at least once.

With the aid of method step S4, a "subsequent supply" of brake liquid into the at least one wheel brake cylinder is effectuated, whereby a new holding pressure equal or not equal to the initial holding pressure is built up in the at least one wheel brake cylinder. To build up the new holding pressure in the at least one wheel brake cylinder, firstly in a sub-step S4a (while the at least one shutoff valve is still provided closed), an intermediate pressure less than the new holding pressure is built up between the at least one shutoff valve and the at least one brake pressure buildup device with the aid of the at least one brake pressure buildup device. In a further sub-step S4b executed at a point in time t2+δt (where δt→0), the at least one shutoff valve is opened if the intermediate pressure is present between the at least one shutoff valve and the at least one brake pressure buildup device. It is to be expressly noted that the opening of the at least one shutoff valve takes place if the intermediate pressure less than the new holding pressure is present. A pressure difference present between the wheel brake cylinder pressure (actually) present in the at least one wheel brake cylinder and the intermediate pressure upon opening of the at least one shutoff valve (at point in time t2+δt) is significantly less than a so-called highest pressure difference between the wheel brake cylinder pressure (actually) present in the at least one wheel brake cylinder and the new holding pressure. In contrast to the related art, the execution of method step S4b therefore does not effectuate a significant overflow of the at least one open shutoff valve. An audible overflow of the at least one shutoff valve is therefore avoided. The "subsequent supply" of brake fluid therefore takes place in a nearly noiseless manner upon the execution of the method described here. The "subsequent supply" effectuated with the aid of method step S4 is thus significantly quieter than in the related art.

For example, an intermediate pressure less by a factor of between 1.2 and 10 in comparison to the new holding pressure may be built up between the at least one shutoff valve and the at least one brake pressure buildup device with the aid of the at least one brake pressure buildup device. In particular, an intermediate pressure less by a factor of between 1.3 and 10 in comparison to the new holding pressure may be built up between the at least one shutoff valve and the at least one brake pressure buildup device with the aid of the at least one brake pressure buildup device. The intermediate pressure may be less, for example, by a factor of between 1.5 and 8, specifically by a factor of between 1.8 and 5, particularly by a factor of between 2 and 5 than the new holding pressure. Such an intermediate pressure is generally present relatively close to the beginning of a "subsequent supply" in the wheel brake cylinder pressure (actually) present in the at least one wheel brake cylinder. An audible overflow of the at least one shutoff valve is reliably prevented in this case.

In one preferred embodiment of the method described here, an intermediate pressure equal to the estimated or measured wheel brake cylinder pressure is built up between the at least one shutoff valve and the at least one brake pressure buildup device with the aid of the at least one brake pressure buildup device. If a measurement or the estimation of the wheel brake cylinder pressure is executed correctly, (near) pressure equality therefore prevails between the wheel brake cylinder pressure (actually) present in the at least one wheel brake cylinder and the intermediate pressure upon opening of the at least one shutoff valve (at point in time t2+δt). In this ideal case, the opening of the at least one shutoff valve (at point in time t2+δt) therefore does not trigger an overflow of the at least one shutoff valve.

In a further sub-step S4c executed from a point in time t3, brake fluid is transferred with the aid of the at least one brake pressure buildup device through the at least one open shutoff valve into the at least one wheel brake cylinder. During the execution of sub-step S4c, the wheel brake cylinder pressure is preferably increased by a comparatively flat pressure gradient with the aid of the at least one brake pressure buildup device. The pressure gradient by which the wheel brake cylinder pressure may be increased with the aid of the at least one brake pressure buildup device during sub-step S4c may be, for example, less than or equal to 150 bar/s (bar per second), preferably less than or equal to 100 bar/s (bar per second), in particular less than or equal to 50 bar/s (bar per second), specifically less than or equal to 30 bar/s (bar per second), if desired less than or equal to 10 bar/s (bar per second). This is linked to no/hardly any noise generation. Sub-step S4c is preferably executed until the new holding pressure is present in the at least one wheel brake cylinder. At a point in time t4, in a method step S6, the new holding pressure is "enclosed" in the at least one wheel brake cylinder by closing the at least one shutoff valve again.

Method steps S3 through S6 may subsequently be repeated until an end of the holding function is desired by the driver of the vehicle.

The initial holding pressure and the new holding pressure may be built up with the aid of a motorized piston-cylinder device of the hydraulic braking system, with the aid of at least one pump of the hydraulic braking system, and/or with the aid of an electromechanical brake booster connected upstream from a master brake cylinder of the hydraulic braking system as the at least one brake pressure buildup device. A variety of hydraulic braking systems equipped with these braking system components is therefore suitable for executing the above-described method. The exemplary embodiments mentioned here for the at least one brake pressure buildup device are not to be interpreted as exhaustive, however.

Figure 3A:
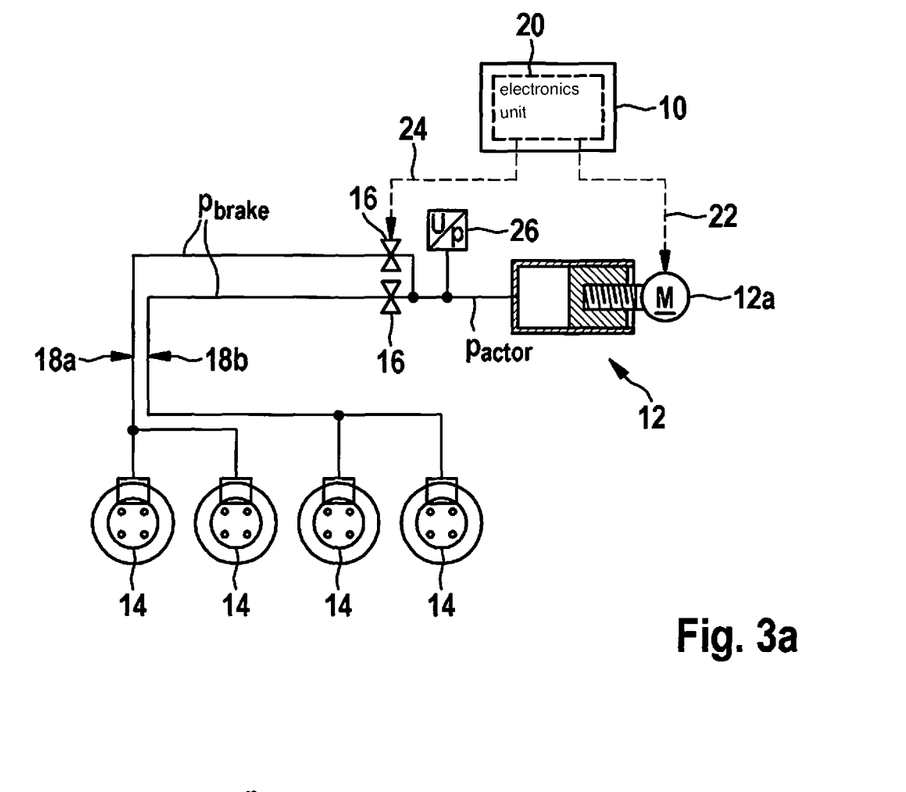
FIGS. 3a and 3b show a schematic view and a coordinate system to explain one specific embodiment of the control device, and the hydraulic braking system equipped therewith.
Figure 3B:
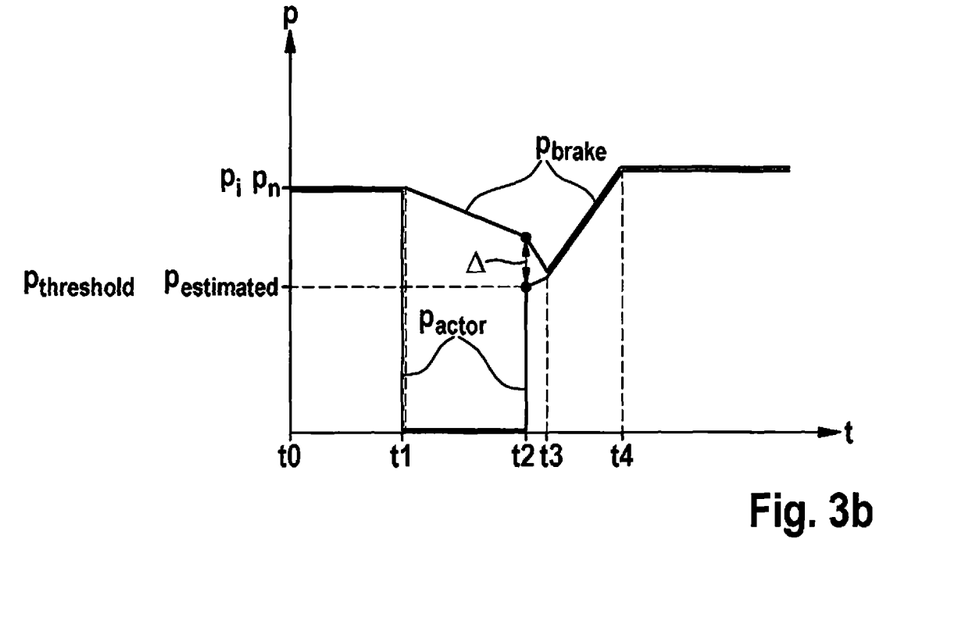

FIGS. 3a and 3b show a schematic view and a coordinate system to explain one specific embodiment of the control device, and the hydraulic braking system equipped therewith. In the coordinate system of FIG. 3b, an abscissa is a time axis t, while pressures p are indicated with the aid of an ordinate.

The hydraulic braking system which is partially schematically shown in FIG. 3a is only to be interpreted as an example. A usability of control device 10 is not restricted to an interaction with this braking system type. Instead, control device 10 (or a modification of control device 10) may be used with a variety of different hydraulic braking systems, if the particular hydraulic braking system includes at least one (motorized) brake pressure buildup device 12, at least one wheel brake cylinder 14, and at least one shutoff valve 16 situated between the at least one wheel brake cylinder 14 and the at least one brake pressure buildup device 12. Solely by way of example, the braking system of FIG. 3a is designed having two brake circuits 18a and 18b (each having two wheel brake cylinders 14), each of the two brake circuits 18a and 18b being connected via a separate shutoff valve 16 to single brake pressure buildup device 12. Moreover, the usability of control device 10 is not limited to a specific vehicle type/motor vehicle type of a vehicle/motor vehicle equipped with the hydraulic braking system.

In the specific embodiment of FIGS. 3a and 3b, the at least one (motorized) brake pressure buildup device is a piston-cylinder device (plunger device) 12 designed having a motor 12a. However, it is to be noted that such a design of the at least one brake pressure buildup device 12 is only to be interpreted as an example. For example, the at least one brake pressure buildup device 12 may also include at least one pump of the hydraulic braking system and/or an electromechanical brake booster connected upstream from a master brake cylinder (not shown) of the hydraulic braking system. The examples listed here for the at least one brake pressure buildup device 12 are also only to be interpreted as examples.

Control device 10 may also be referred to as a regulating and/or control unit. In particular, control device 10 may be described as (part of a) "parking brake." Control device 10 has an electronics unit 20, which is designed to activate (at least) the at least one brake pressure buildup device 12 (with the aid of at least one motor control signal 22) and the at least one shutoff valve 16 situated between the at least one wheel brake cylinder 14 and the at least one brake pressure buildup device (with the aid of at least one valve control signal 24). At least one further vehicle component, for example, at least one further braking system component, may also be activatable with the aid of electronics unit 20. Electronics unit 20 is designed above all for executing a holding function, which is shown with the aid of the coordinate system of FIG. 3b. In the coordinate system of FIG. 3b, a graph $p_{brake}$ indicates a wheel brake cylinder pressure $p_{brake}$ (actually) present in the at least one wheel brake cylinder 14, while an actuator pressure $p_{actuator}$ (actually) present between the at least one shutoff valve 16 and the at least one brake pressure buildup device 12 is shown with the aid of at least one further graph $p_{actuator}$. Examples of the holding function executable with the aid of electronics unit 20 have already been mentioned above.

From a point in time t0, the at least one brake pressure buildup device 12 is activated by electronics unit 20 in such a way that an initial holding pressure $p_i$ may be built up/is built up in the at least one wheel brake cylinder 14 with the aid of the at least one activated brake pressure buildup device 12. At a point in time t1, the at least one shutoff valve 16 is activated by electronics unit 20 in such a way that initial holding pressure pi is temporarily "enclosable" in the at least one wheel brake cylinder 14 with the aid of closing of the at least one activated shutoff valve 16. Immediately thereafter, the at least one brake pressure buildup device 12 is deactivated/shut off, so that actuator pressure $p_{actuator}$ present between the at least one shutoff valve 16 and the at least one brake pressure buildup device 12 drops to (nearly) zero. However, a fast pressure drop of wheel brake cylinder pressure $p_{brake}$ (actually) present in the at least one wheel brake cylinder 14 may be prevented with the aid of the closing (and keeping closed) of the at least one shutoff valve 16. Wheel brake cylinder pressure $p_{brake}$ may therefore be held for multiple minutes at (approximately) initial holding pressure $p_i$ after point in time t1. An activation of braking system components 12 and 16 is not necessary during this pressure holding phase.

Electronics unit 20 is additionally designed to execute a so-called "subsequent supply" of brake fluid into the at least one wheel brake cylinder 14. The "subsequent supply" preferably takes place if/when a (significant) pressure drop difference is present or appears probable between the (desired) initial holding pressure and the wheel brake cylinder pressure (actually) present in the at least one wheel brake cylinder (for example, greater than a specified minimum pressure drop difference). For example, electronics unit 20 is designed to execute the "subsequent supply" if, after the closing of the at least one shutoff valve 14 (at point in point in time t1), a pressure variable $p_{estimated}$ which is provided at electronics unit 20 (as a measured or estimated variable) or is estimated by electronics unit 20 with respect to wheel brake cylinder pressure $p_{brake}$ present in the at least one wheel brake cylinder 14 falls below a specified threshold value variable and/or, after the closing of the at least one shutoff valve 16 (at point in time t1), a predefined waiting time is exceeded.

With the aid of the "subsequent supply" of brake fluid into the at least one wheel brake cylinder 14, a new holding pressure $p_n$ equal or not equal to initial holding pressure $p_i$ may be/is built up in the at least one wheel brake cylinder 14. (Solely by way of example, in this specific embodiment, new holding pressure $p_n$ is equal to initial holding pressure $p_i$.). Brake circuits 18a and 18b therefore do not have to be designed as ideally leak-tight for holding initial holding pressure $p_i$. Even in the case of a relatively "leaky" design of brake circuits 18a and 18b, an undesirable rolling away of the vehicle may be prevented even for a longer period, for example, 10 minutes, with the aid of an (at least once) "subsequent supply".

In the specific embodiment of FIGS. 3a and 3b, electronics unit 20 begins from a point in time t2 with a renewed activation of the at least one brake pressure buildup device 12. While the at least one shutoff valve 16 still remains closed, the at least one actuator pressure $p_{actuator}$ present between the at least one shutoff valve and the at least one brake pressure buildup device 12 is increased from point in time t2. Moreover, electronics unit 20 is designed to build up new holding pressure $p_n$ in the at least one wheel brake cylinder 14, in that the at least one shutoff valve 16 being opened if an intermediate pressure $P_{threshold}$, which is built up with the aid of the at least one activated brake pressure buildup device 12, less than holding pressure $p_n$ is present between the at least one shutoff valve and the at least one brake pressure buildup device 12. This takes place, for example, at a point in time t2+δt (where δt→0). The opening of the at least one shutoff valve 16 upon the presence of intermediate pressure $p_{threshold}$ less than new holding pressure $p_n$ triggers at most a slight overflow of the at least one shutoff valve 16, which is barely/not at all linked to noise generation, however. It is therefore apparent in the coordinate system of FIG. 3b that at a point in time t3 with pressure equality between the at least one brake pressure buildup device 12 and the at least one wheel brake cylinder 14, wheel brake cylinder pressure $p_{brake}$ present at point in time t2+δt is only slightly reduced and actuator pressure $p_{actuator}$ present at point in time t2+δt is only slightly increased. Control device 10 therefore also provides a significantly lower-noise "subsequent supply" of brake fluid, which is not/barely acoustically perceptible.

Intermediate pressure $P_{threshold}$ may be measured accurately and reliably with the aid of a pressure sensor 26 connected to the at least one brake pressure buildup device 12. However, it is not necessary to equip the hydraulic braking system with an additional pressure sensor for measuring wheel brake cylinder pressure $p_{brake}$.

In the specific embodiment of FIGS. 3a and 3b, electronics unit 20 is designed to execute the opening of the at least one shutoff valve 16 if an intermediate pressure $p_{threshold}$ corresponding to estimated pressure variable $p_{estimated}$ is present between the at least one shutoff valve 16 and the at least one brake pressure buildup device 12. A pressure difference Δ, which is present upon opening of the at least one shutoff valve 16 (at point in time t2+δt) between wheel brake cylinder pressure $p_{brake}$ (actually) present in the at least one wheel brake cylinder and intermediate pressure $p_{threshold}$ corresponding to estimated pressure variable $p_{estimated}$, is therefore comparatively small and is negligible (with respect to a noise generation). The same advantage is provided if electronics unit 20 is designed to execute the opening of the at least one shutoff valve 16 if an intermediate pressure $p_{threshold}$ less by a factor of between 1.2 and 10 in comparison to new holding pressure $p_n$ is present between the at least one shutoff valve 16 and the at least one brake pressure buildup device 12. Further value ranges for the factor between new holding pressure $p_n$ and smaller intermediate pressure $p_{threshold}$ have already been mentioned above.

Moreover, at the latest from point in time t3, the at least one brake pressure buildup device 12 is activated by electronics unit 20 in such a way that brake fluid is transferable/is transferred with the aid of the at least one activated brake pressure buildup device 12 through the at least one open shutoff valve 16 into the at least one wheel brake cylinder 14. At a point in time t4, when new holding pressure $p_n$ is present in the at least one wheel brake cylinder 14, the at least one shutoff valve 16 is again activated by electronics unit 20 in such a way that new holding pressure $p_n$ is enclosable/is enclosed in the at least one wheel brake cylinder 14 by closing the at least one activated shutoff valve 16 again.

What is claimed is:

1. A method for executing a holding function with the aid of a hydraulic braking system of a vehicle, comprising:
building up an initial holding pressure in at least one wheel brake cylinder of the hydraulic braking system with the aid of at least one brake pressure buildup device of the hydraulic braking system and closing at least one shutoff valve situated between the at least one wheel brake cylinder and the at least one brake pressure buildup device in such a way that the initial holding pressure is temporarily enclosed in the at least one wheel brake cylinder;
building up a new holding pressure, in the at least one wheel brake cylinder, equal or not equal to the initial holding pressure, wherein the new holding pressure is enclosed in the at least one wheel brake cylinder by closing the at least one shutoff valve again;
wherein the new holding pressure is built up in the at least one wheel brake cylinder by:
with the aid of the at least one brake pressure buildup device, with the at least one shutoff valve closed, building up, between the at least one shutoff valve and the at least one brake pressure buildup device, an intermediate pressure less than the new holding pressure;
opening the at least one shutoff valve upon presence of the intermediate pressure between the at least one shutoff valve and the at least one brake pressure buildup device; and
transferring brake fluid with the aid of the at least one brake pressure buildup device through the at least one open shutoff valve into the at least one wheel brake cylinder.

2. The method as recited in claim 1, wherein the intermediate pressure built up between the at least one shutoff valve and the at least one brake pressure buildup device with the aid of the at least one brake pressure buildup device is less by a factor of between 1.2 and 10 in comparison with the new holding pressure.

3. The method as recited in claim 2, wherein the intermediate pressure built up between the at least one shutoff valve and the at least one brake pressure buildup device with the aid of the at least one brake pressure buildup device is less by a factor of between 1.3 and 10 in comparison with the new holding pressure.

4. The method as recited in claim 1, wherein the intermediate pressure built up between the at least one shutoff valve and the at least one brake pressure buildup device with the aid of the at least one brake pressure buildup device is equal to an estimated or measured wheel brake cylinder pressure.

5. The method as recited in claim 1, wherein the initial holding pressure and the new holding pressure are built up with the aid of at least one of: (i) a motorized piston-cylinder device of the hydraulic braking system, (ii) at least one pump of the hydraulic braking system, and (iii) an electromechanical brake booster connected upstream from a master brake cylinder of the hydraulic braking system as the at least one brake pressure buildup device.

6. The method as recited in claim 1, wherein after the at least one shutoff valve is closed to temporarily enclose the initial holding pressure in the at least one wheel brake cylinder, pressure in the at least one wheel brake cylinder decreases from the initial holding pressure while the at least one shutoff valve is closed, and wherein the intermediate pressure is less than the initial holding pressure.

7. The method as recited in claim 6, wherein when the at least one shutoff is closed to temporarily enclose the initial holding pressure, the at least one brake pressure buildup device is deactivated.

8. The method as recited in claim 7, wherein the building up of the intermediate pressure between the at least one shutoff valve and the at least one brake pressure buildup device occurs only after: (i) an estimated or measured pressure in the at least one wheel brake cylinder falls below a predefine threshold value, or (ii) a predefined waiting time from the closing of the at least one shutoff valve to temporarily enclose the initial holding pressure is exceeded.

9. The method as recited in claim 7, wherein the building up of the intermediate pressure between the at least one shutoff valve and the at least one brake pressure buildup device occurs after an estimated or measured pressure in the at least one wheel brake cylinder falls below a predefined threshold value, and wherein the intermediate pressure is equal to the estimated or measured pressure in the at least one wheel brake cylinder.

10. A control device for a hydraulic braking system of a vehicle, comprising:

an electronics unit designed to activate at least one brake pressure buildup device of the hydraulic braking system and at least one shutoff valve situated between at least one wheel brake cylinder of the hydraulic braking system and the at least one brake pressure buildup device;

wherein the electronics unit is designed to execute a holding function, the electronics unit designed to:

build up an initial holding pressure in the at least one wheel brake cylinder with the aid of the at least one activated brake pressure buildup device, the initial holding pressure being temporarily enclosed in the at least one wheel brake cylinder with the aid of closing of the at least one activated shutoff valve; and build up a new holding pressure, in the at least one wheel brake cylinder, equal or not equal to the initial holding pressure, the new holding pressure is enclosable in the at least one wheel brake cylinder by closing the at least one activated shutoff valve again; and wherein the electronics unit is additionally designed to build up the new holding pressure in the at least one wheel brake cylinder by opening the at least one shutoff valve upon a presence of an intermediate pressure, which is built up, with the at least one shutoff valve closed, with the aid of the at least one activated brake pressure buildup device between the at least one shutoff valve and the at least one brake pressure buildup device, less than the new holding pressure, in such a way that brake fluid is transferred with the aid of the at least one activated brake pressure buildup device through the at least one open shutoff valve into the at least one wheel brake cylinder.

11. The control device as recited in claim 10, wherein the electronics unit is designed to execute the opening of the at least one shutoff valve if the intermediate pressure is present between the at least one shutoff valve and the at least one brake pressure buildup device, wherein the intermediate pressure is less by a factor of between 1.2 and 10 in comparison with the new holding pressure.

12. The control device as recited in claim 10, wherein the electronics unit is designed to execute the opening of the at least one shutoff valve if the intermediate pressure is present between the at least one shutoff valve and the at least one brake pressure buildup device which corresponds to a pressure variable, which is provided at the electronics unit or estimated by the electronics unit, with respect to a wheel brake cylinder pressure present in the at least one wheel brake cylinder.

13. The control device as recited in claim 10, wherein at least one of: (i) a motorized piston-cylinder device of the hydraulic braking system, (ii) at least one pump of the hydraulic braking system, and (iii) an electromechanical brake booster connected upstream from a master brake cylinder of the hydraulic braking system, are activatable as the at least one brake pressure buildup device with the aid of the electronics unit.

14. A hydraulic braking system for a vehicle, comprising:
at least one brake pressure buildup device;
at least one wheel brake cylinder;
at least one shutoff valve situated between the at least one wheel brake cylinder and the at least one brake pressure buildup device; and
a control device for the hydraulic braking system of a vehicle, the control device including an electronics unit designed to activate the at least one brake pressure buildup device of the hydraulic braking system and the at least one shutoff valve situated between the at least one wheel brake cylinder of the hydraulic braking system and the at least one brake pressure buildup device;

wherein the electronics unit is designed to execute a holding function, the electronics unit designed to:

build up an initial holding pressure in the at least one wheel brake cylinder with the aid of the at least one activated brake pressure buildup device, the initial holding pressure being temporarily enclosed in the at least one wheel brake cylinder with the aid of closing of the at least one activated shutoff valve; and build up a new holding pressure, in the at least one wheel brake cylinder, equal or not equal to the initial holding pressure, the new holding pressure is enclosable in the at least one wheel brake cylinder by closing the at least one activated shutoff valve again; and wherein the electronics unit is additionally designed to build up the new holding pressure in the at least one wheel brake cylinder by opening the at least one shutoff valve upon a presence of an intermediate pressure, which is built up with the at least one shutoff valve closed, with the aid of the at least one activated brake pressure buildup device between the at least one shutoff valve and the at least one brake pressure buildup device, less than the new holding pressure, in such a way that brake fluid is transferred with the aid of the at least one activated brake pressure buildup device through the at least one open shutoff valve into the at least one wheel brake cylinder.

* * * * *